United States Patent
Phillips et al.

(10) Patent No.: US 7,390,839 B2
(45) Date of Patent: Jun. 24, 2008

(54) BLENDS OF ALKYL SUBSTITUTED TRIARYL PHOSPHATE ESTERS WITH PHOSPHORUS-CONTAINING FLAME RETARDANTS FOR POLYURETHANE FOAMS

(75) Inventors: Matthew D Phillips, Camden, IN (US); Richard S Rose, West Lafayette, IN (US); Stephen B Falloon, Lafayette, IN (US)

(73) Assignee: Great Lakes Chemical Corporation, West Lafayette, IN (US)

( * ) Notice: Subject to any disclaimer, the term of this patent is extended or adjusted under 35 U.S.C. 154(b) by 78 days.

(21) Appl. No.: 11/333,398

(22) Filed: Jan. 17, 2006

(65) Prior Publication Data

US 2006/0116432 A1    Jun. 1, 2006

Related U.S. Application Data

(63) Continuation of application No. 10/441,573, filed on May 20, 2003, now abandoned.

(60) Provisional application No. 60/381,915, filed on May 20, 2002.

(51) Int. Cl.
*C08G 18/06* (2006.01)

(52) U.S. Cl. ............... 521/107; 521/108; 521/170; 521/174

(58) Field of Classification Search ............ 521/107, 521/108, 170, 174
See application file for complete search history.

(56) References Cited

U.S. PATENT DOCUMENTS

| | | | | |
|---|---|---|---|---|
| 4,206,067 A * | 6/1980 | MacKinnon | ............... | 252/75 |
| 4,565,833 A * | 1/1986 | Buszard et al. | ............ | 521/107 |
| 4,696,952 A * | 9/1987 | Shimomura et al. | ........ | 521/107 |
| 5,863,999 A * | 1/1999 | Kinker et al. | ............. | 526/328 |
| 5,958,993 A * | 9/1999 | Blundell et al. | ............ | 521/168 |
| 6,083,428 A * | 7/2000 | Ueda et al. | ................ | 252/609 |
| 6,254,799 B1 * | 7/2001 | Antika et al. | ............. | 252/78.5 |
| 6,652,772 B2 * | 11/2003 | Antika et al. | ............. | 252/78.5 |
| 6,667,355 B2 * | 12/2003 | Rose et al. | ................ | 524/130 |
| 6,703,355 B2 * | 3/2004 | Antika et al. | ............. | 508/433 |
| 2003/0060377 A1 * | 3/2003 | Antica et al. | ............. | 508/433 |

FOREIGN PATENT DOCUMENTS

EP      0428221    *  5/1991

* cited by examiner

*Primary Examiner*—John Cooney
(74) *Attorney, Agent, or Firm*—James Sher

(57) ABSTRACT

Flame retardant flexible polyurethane foam compositions, methods of flame retarding flexible polyurethane foam compositions, articles made therefrom and flame retardants that comprise blends of (alkyl substituted) triaryl phosphate ester and phosphorus-containing flame retardant having at least about 5 wt. % phosphorus additives. The combined weight of the (alkyl substituted) triaryl phosphate ester and the phosphorus-containing flame retardant comprises about 5 to about 40% by weight of the flexible polyurethane foam compositions or reaction mixtures. The ratio of the (alkyl substituted) triaryl phosphate ester to the phosphorus-containing flame retardant is from about 95:5 to about 50:50 percent by weight.

30 Claims, No Drawings

BLENDS OF ALKYL SUBSTITUTED TRIARYL PHOSPHATE ESTERS WITH PHOSPHORUS-CONTAINING FLAME RETARDANTS FOR POLYURETHANE FOAMS

This application is a continuation of U.S. application Ser. No. 10/441,573 filed May 20, 2003, which claims priority to U.S. Provisional Application No. 60/381,915, filed on May 20, 2002.

BACKGROUND OF THE INVENTION

1. Field of the Invention

The present invention relates to flame retardant polyurethane compositions, and more particularly to flame retardant flexible polyurethane foam compositions, methods of flame retarding flexible polyurethane foam compositions, articles made therefrom and flame retardants that comprise blends of alkylated triaryl phosphate esters and phosphorus-containing flame retardant additives.

2. Description of Related Art

Polyurethanes are polymers produced by the reaction of an isocyanate and a hydroxyl-containing material, such as a polyol. Polyurethanes are available in many different forms including a flexible foam, which is typically formed by treating a polyol with a diisocyanate in the presence of water and a catalyst. This reaction results in a flexible foam composition having an abundance of carbon-hydrogen bonds, a large surface area, and an open cell structure. Due, at least in part, to these characteristics, the flexible polyurethane foam is extremely susceptible to combustion. Accordingly, flame retardant additives are often used to reduce the risk and severity of flexible polyurethane foam combustion.

Flame retardant additives commonly used in flexible polyurethane foams typically contain halogens. Non-halogen flame retardant additives have also been used. However, non-halogen flame retardant additives may be less efficient than halogenated flame retardants, thereby prompting the use of higher flame retardant additive levels to compensate for this lower efficiency. Unfortunately, the use of higher flame retardant additive levels may contribute to reduced foam physical properties.

Triaryl phosphate-based flame retardant agents have been used in thermoplastic compositions. However, such agents may form a liquid deposit on the injection molds, which may adversely affect the environmental stress crack resistance of the resulting thermoplastic resins.

Historically, the first commercially available triaryl phosphates were derived from coal tar and included tricresyl phosphate, trixylyl phosphate, and mixtures of triaryl phosphates. Isopropylated and butylated synthetic triaryl phosphates were later developed as direct substitutes for coal tar derivatives and were mainly used as plasticizers for polyvinylchloride (PVC) compositions. During the development of flame retardant applications, the trend for newer additives was toward higher performance through increased phosphorus content and lower viscosity.

Alkylated triaryl phosphate esters have been used as flame retardants for flexible polyurethane foam for many years. These esters combine good hydrolytic and thermal stability with flame retardant efficiency provided by their phosphorus content. Triaryl phosphate esters are used either alone, or more commonly, in conjunction with halogenated additives.

U.S. Pat. No. 4,746,682 to Green discloses blending alkylated triaryl phosphate esters with brominated diphenyl oxide for use as a flame retardant for polyurethane. U.S. Pat. No. 4,565,833 to Buszard et al. discloses the use of isopropylated phosphate esters as flame retardant agents in rigid polyurethanes or polyisocyanurates. These esters contain varying levels of triphenyl phosphate (TPP). The use of triphenyl phosphate has hereto been desirable because it was found to reduce viscosity and contribute to higher phosphorus content. Phosphorus is known to contribute to performance as a flame retardant.

Alkylated triphenyl phosphates that have been recommended and used as flame retardants have had phosphorus contents in excess of 7.7 percent. Butylated phosphates available and recommended for use as flame retardants have a phosphorus content of at least 8 percent (AKZO-Nobel Functional Chemicals Bulletin 99-94, 1999).

U.S. Pat. No. 5,958,993 to Blundell et al. discloses the use of resorcinol bisdiphenylphosphate (RDP) to impart flame retardency to polyurethane compositions.

SUMMARY OF THE INVENTION

According to the present invention, it has been unexpectedly discovered that blends of (alkylated)triaryl phosphates and any phosphorus source having at least 5 wt. % phosphorus demonstrate enhanced performance as compared to the individual flame retardant components.

According to various features, characteristics and embodiments of the present invention, which will become apparent as the description thereof proceeds, the present invention provides a flame retardant polyurethane composition including an (alkyl substituted) triaryl phosphate ester; a phosphorus-containing flame retardant having at least about 5 wt. % phosphorus and comprising at least one monomeric phosphorus-containing compound, dimeric phosphorus-containing compound or mixture thereof; and a flexible polyurethane foam reaction mixture including at least one polyol and at least one isocyanate.

The present invention further provides a flame retardant polyurethane composition including a flexible polyurethane foam reaction mixture including at least one polyol and at least one isocyanate; and a flame retardant additive comprising an (alkyl substituted) triaryl phosphate ester; and a phosphorus-containing flame retardant comprising at least one monomeric phosphorus-containing compound, dimeric phosphorus-containing compound or mixture thereof, wherein the ratio of the (alkyl substituted) triaryl phosphate ester to the phosphorus-containing flame retardant is from about 95:5 to about 50:50 percent by weight.

The present invention further provides a flame retardant additive for use in flame retarding a flexible polyurethane foam reaction mixture, which includes at least one polyol and at least one isocyanate. The flame retardant additive includes an (alkyl substituted) triaryl phosphate ester ester; and a phosphorus-containing flame retardant having at least about 5 wt. % phosphorus and including at least one monomeric phosphorus-containing compound or dimeric phosphorus-containing compound, wherein the combined weight of the (alkyl substituted) triaryl phosphate ester and the phosphorus-containing flame retardant comprises about 5 to about 40% by weight of the polyol.

The present invention further provides a method of making flame retarded flexible polyurethane compositions including the steps of adding to a flexible polyurethane foam reaction mixture about 5 to about 40% by weight of polyol of a flame retardant additive comprising: an (alkyl substituted) triaryl phosphate ester; and a phosphorus-containing flame retardant having at least about 5 wt. % phosphorus and including at least one monomeric phosphorus-containing compound or dimeric phosphorus-containing compound.

DETAILED DESCRIPTION

The invention relates to flame retardant flexible polyurethane foam compositions and methods of flame retarding flexible polyurethane foams. The compositions comprise an otherwise flammable flexible polyurethane foam mixture and a two component flame retardant additive. The flexible polyurethane foam may be any well known, industrial polyurethane composition. Such flexible polyurethane foam mixtures generally include at least one polyol and at least one isocyanate. The two-component flame retardant additive generally includes one or more (alkyl substituted) triaryl phosphate esters (Component A), and a phosphorous-containing flame retardant additive having at least 5 wt. % phosphorus (Component B) and including at least one monomeric or dimeric phosphorous-containing compound.

Examples of (alkyl substituted) triaryl phosphate esters suitable for use as Component A according to the present invention are represented by the general structure (I), illustrated below, where each R is independently either a linear or branched $C_1$ to $C_6$ alkyl group, and n is an integer of 0, 1 or 2.

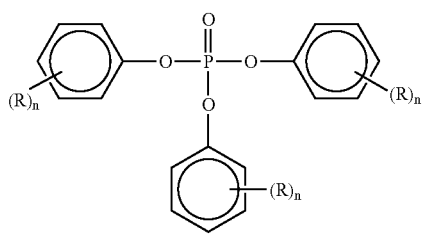

(I)

In general, the alkylated triaryl phosphate esters used in the present invention contain from about 6 wt. % to about 9 wt. % phosphorus, depending on the degree of alkylation. Specific examples of (alkyl substituted) triaryl phosphate esters that have structure (I) and that are suitable for use as Component A include: tricresyl phosphate, butylated triphenyl phosphate, isopropylated triphenyl phosphate, and triphenyl phosphate. Examples of (alkyl substituted) triaryl phosphate esters that have been found to be particularly useful as Component A include isopropylated triphenyl phosphates. It should be understood that Component A may be a pure compound such as 4-isopropylphenyl(diphenyl phosphate). Alternatively, Component A may comprise a mixture of alkylated triaryl phosphates in which each individual ring may contain 0, 1 or 2 isopropyl groups. For instance, a mixture of (alkyl substituted) triaryl phosphate esters that has been found to produce desired results as Component A is a mixed isopropylated triphenyl phosphate containing about 8.6% phosphorus and also having about 35 wt. % of non-alkylated triphenyl phosphate. This particular (alkyl substituted) triaryl phosphate ester is sold under the tradename Reofos® 35 and is available from Great Lakes Chemical Corp.

The phosphorous-containing flame retardant additive used as Component B can be any monomeric or dimeric-containing, non-halogen containing phosphorus source that has at least about 5 wt. % phosphorus, and that is not a triaryl phosphate ester represented by the general structure (I) above. Non-halogenated phosphorous sources having less than about 5 wt. % phosphorus may also be used, but it has been determined that excessively high amounts of such phosphorous sources may be required to provide the desired levels of flame retardancy.

Phosphorus sources suitable for use as Component B according to the present invention include phosphates, phosphonates, phosphinates, phosphites and phosphine oxides. These phosphorous sources may contain various alkyl, aryl, or alkaryl groups provided that the size of the group does not cause the phosphorus content to be lower than about 5 wt. %. The phosphorous-containing flame retardant additive may include monomeric, dimeric and/or oligomeric phosphorous sources, but preferably include a substantial amount of monomeric and/or dimeric phosphorous sources.

Phosphorous-containing flame retardant additives particularly suitable for use as Component B include phosphates and phosphonates having one or two phosphorus atoms per molecule. Examples include triethyl phosphate, tris(2-ethylhexyl)phosphate, dimethylmethyl phosphonate, dimethylpropyl phosphonate, and isodecyl diphenyl phosphate. Phosphorous-containing flame retardant additives that have been found to produce desired results according to the present invention include resorcinol bis(diphenyl phosphate) (RDP), tri-n-butyl phosphate (TBP) and tri-iso-butyl phosphate (TiBP).

Components A and B are used in ratios that are readily determined to provide the best balance of properties. These ratios of Component A to Component B are generally from about 95:5 to about 50:50 wt. %, and more typically from about 95:5 to about 80:20. Ratios of about 90 wt. % of the isopropylated triphenyl phosphates to about 10 wt. % of the resorcinol bis(diphenyl phosphate), tri-n-butyl phosphate or tri-iso-butyl phosphate have been found to produce desirable results according to the present invention.

Basically, flexible polyurethane foam compositions can be made according to the present invention by reacting an isocyanate with a polyol in the presence of a foam-forming agent and a blend of (alkyl substituted) triaryl phosphate esters and phosphorus-containing flame retardant additives. Components A and B may be pre-combined before being added to the polyurethane foam reaction mixture, such that the combined Components A and B may be provided as a single flame retardant additive package. Alternatively, Components A and B may be added individually to the polyurethane reaction mixture reactants. When used as a pre-combined package, the A and B combination is typically used in an amount of from about 5 to about 40 php (parts per hundred polyol) based on the polyol used in the polyurethane foam reaction mixture.

The blends of the (alkyl substituted) triaryl phosphate esters and phosphorus-containing flame retardants of the present invention can be used in conjunction with other conventional additives that are used in polyurethane foam compositions such as catalysts, surfactants, cross linkers, dyes, fillers, etc. In addition, the blends of the (alkyl substituted) triaryl phosphate esters and phosphorus-containing flame retardants of the present invention can be used in other types of polymer compositions used to produce synthetic polymers such as thermoplastic polymers, including polyurethanes.

The flame retardant flexible polyurethane foams of the present invention are useful as cushioning materials in home furnishing and automotive applications and other applications that typically involve the use of flexible foam materials.

The features and characteristics of the present invention are further illustrated below in the following non-limiting Examples.

EXAMPLE I

Preparation and Testing of High Density (1.8 lbs/ft$^3$ (28.8 kg/m$^3$)) Polyurethane Foam Samples In this example, flexible polyurethane foam samples were prepared, which had a density of 1.8 lbs/ft$^3$ (28.8 kg/m$^3$) and incorporated either a single component flame retardant additive or the flame retardant additive of the present invention. The formulations used in producing the foam samples include the flame retardant additives listed in Table 1 together with, tolylene diisocyanate (TDI) at an index* of 110 and the following reactants:

| | |
|---|---|
| 56.6 OH Polyether Polyol (Hydroxy No. 56.6; Molecular Weight of 3000) | 100.00 parts by weight |
| Water | 3.50 parts by weight |
| Amine Catalyst (Dabco 8264)** | 0.50 parts by weight |
| Silicone Surfactant (Osi L-620)*** | 1.00 parts by weight |
| Tin Catalyst (Dabco T-9)** | 0.51 parts by weight |

*The measurement 'Index' is a measure of the quantity of reactant required to react stoichiometrically with the sum of all hydroxyl moities present in the reaction mixture from the polyol and water. A 100 index represents 1:1 stoichiometry. A 110 index represents a ten percent excess of reactant for the sum of hydroxyls present.
**Dabco 8264 and Dabco T-9 available from: Air Products & Chemicals Inc. 7201 Hamilton Boulevard, Allentown, PA 18195 U.S.
***Osi L-620 is a polyalkalene oxide-methyl siloxane co-polymer available from: Crompton Corporation American Lane, Greenwich, CT, 06831, United States The foam samples were prepared by mixing the polyol and the flame retardant additive together. The remaining components of the formulations, except for the isocyanate, were added and stirred into the polyol/flame retardant mixture. Finally, the isocyanate was added and stirred into the mixture. The reaction mixture was then poured into a box and allowed to expand fully. The box containing the expanded foam was placed in a ventilated 110° C. oven for 30 minutes (1,800 sec) to accelerate curing. Foam samples were removed from the boxes and stored under ambient conditions for at least twenty four hours prior to testing. All of the resulting foam samples had similar densities of about 1.8 lbs/ft$^3$ (28.8 kg/m$^3$) and similar porosities of about 2 ft$^3$/min (56.6 L/min) airflow.

The samples were then tested using the "Cal 117" test in order to evaluate flame retardant properties. The "Cal 117" test is a vertical burn test described by the State of California Department of Consumer Affairs, Bureau of Home Furnishings, Technical Bulletin No. 117, REQUIREMENTS, TEST PROCEDURE AND APPARATUS FOR TESTING THE FLAME RETARDANCE OF RESILIENT FILLING MATERIALS USED IN UPHOLSTERED FURNITURE, January 1980, which is incorporated herein by reference.

Table 1 illustrates the properties of foam samples having the minimum amounts of flame retardant additive necessary to achieve a pass rating in the Cal 117 test. More particularly, samples 1-6 are comparative samples in which single component flame retardant additives were used. Samples 7-14 use an (alkyl substituted) triaryl phosphate ester/phosphorous-containing flame retardant blend in accordance with the present invention. As illustrated in Table 1, the foam samples using the two component flame retardant blend of the present invention demonstrated an increase in flame retardant efficiency, requiring less flame retardant additive (as compared to the single component flame retardant additive) to achieve effective flame retardation.

TABLE 1

| Sample No. | | Quantity of Flame Retardant Additive (parts per hundred polyol) | Result |
|---|---|---|---|
| | Single Component Flame Retardant Additive | | |
| 1. | Reofos ® 35 | 12 | pass |
| 2. | Reofos ® RDP | 18 | pass |
| 3. | Reomol ® TiBP | >18 | pass |
| 4. | Reomol ® TBP | >18 | pass |
| 5. | Reomol ® TOP | >18 | pass |
| 6. | Kronitex ® TCP | 14 | pass |
| | Two Component Flame Retardant Additive (Component A:Component B) | | |
| 7. | Reofos ® 35/RDP (90:10) | 9 | pass |
| 8. | Reofos ® 35/RDP (80:20 ratio) | 11 | pass |
| 9. | Reofos ® 35/RDP (70:30 ratio) | 18 | pass |
| 10. | Reofos ® 35/TiBP (90:10 ratio) | 9 | pass |
| 11. | Reofos ® 35/TBP (90:10 ratio) | 9 | pass |
| 12. | Reofos ® 35/Reomol ® TOP (90:10) | 9 | pass |
| 13. | Kronitex ® TCP/RDP (90:10) | 9 | pass |
| 14. | Kronitex ® TCP/TiBP (90:10) | 9 | pass |

Reofos ® 35 = Isopropylated triaryl phosphates
Reofos ® RDP = Resorcinol bis-(diphenyl phosphate)
Reomol ® TiBP = Tri-isobutyl phosphate
Reomol ® TBP = Tri-n-butyl phosphate
Reomol ® TOP = Tris (2-ethylhexyl) phosphate
Kronitex ® TCP = Tricresyl phosphate

EXAMPLE II

Preparation and Testing of Low Density (1.2 lbs/ft$^3$ (19.2 kg/m$^3$)) Polyurethane Foam Samples Flame-retarded polyurethane foam samples were prepared, which had a density of 1.2 lbs/ft$^3$ (19.2 kg/m$^3$), a porosity of 6 ft$^3$/min (169 L/min) air flow, and which incorporated either a single component flame retardant additive or the two component flame retardant additive of the present invention. The samples were prepared using the procedure described above in Example I, the flame retardant additives listed in Table 2 and the following formulation:

| | |
|---|---|
| 56.6 OH Polyether Polyol (Hydroxy No. 56.6; Molecular Weight of 3000) | 100.00 parts by weight |
| Water | 6.20 parts by weight |
| Amine Catalyst (Dabco 8264)* | 0.50 parts by weight |
| Silicone Surfactant (Osi L-620)** | 1.00 parts by weight |
| Tin Catalyst (Dabco T-9)* | 0.56 parts by weight |

*Dabco 8264 and Dabco T-9 available from: Air Products & Chemicals Inc. 7201 Hamilton Boulevard, Allentown, PA 18195 U.S.
**Osi L-620 is a polyalkalene oxide-methyl siloxane co-polymer available from: Crompton Corporation American Lane, Greenwich, CT, 06831, United States The resulting polyurethane foam samples were tested using the Cal 117 test as described and referenced in Example I. Table 2 illustrates the properties of foam samples having the minimum amount of flame retardant additive necessary to achieve a pass rating on the Cal 117 test. More particularly, Sample 1 is a comparative example in which Reofos® 35, alone, was added to the polyurethane mixture as the flame retardant. Samples 2-5 use a two component blend of an (alkyl substituted) triaryl phosphate ester/phosphorous-containing flame retardant in accordance with the present invention. As illustrated in Table 2, the triaryl phosphate ester/phosphorous containing flame retardant blends demonstrated an increase in flame retardant efficiency, requiring less flame retardant additive (as compared to Reofos® 35, alone) to achieve flame retardation.

TABLE 2

| Sample No. | Flame Retardant Additive (Component A:Component B) | Quantity (parts per hundred polyol) | Result |
|---|---|---|---|
| 1. | Reofos ® 35 | 30 | pass |
| 2. | Reofos ® 35/TiBP (90:10) | 22 | pass |
| 3. | Reofos ® 35/RDP (90:10) | 22 | pass |
| 4. | Reofos ® 35/RDP (80:20) | 24 | pass |
| 5. | Reofos ® 35/RDP (70:30) | 28 | pass |

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A flame retardant polyurethane composition comprising:
    an alkyl substituted triaryl phosphate ester;
    a phosphorous-containing flame retardant having at least about 5 wt. % phosphorus selected from the group consisting of: tris(2-ethylhexyl) phosphate, resorcinol bis(diphenyl phosphate), tri-n-butyl phosphate, tri-isobutyl phosphate, and mixtures thereof, wherein the combined weight of the alkyl substituted triaryl phosphate ester and the phosphorus-containing flame retardant comprises about 5 to about 40% by weight of polyol, and wherein the ratio of the alkyl substituted triaryl phosphate ester to the phosphorus-containing flame retardant is from about 95:5 to about 80:20 percent by weight; and
    a flexible polyurethane foam reaction mixture including at least one polyol and at least one isocyanate.

2. The flame retardant polyurethane composition of claim 1, wherein the alkyl substituted triaryl phosphate ester includes one or more compounds having the general formula:

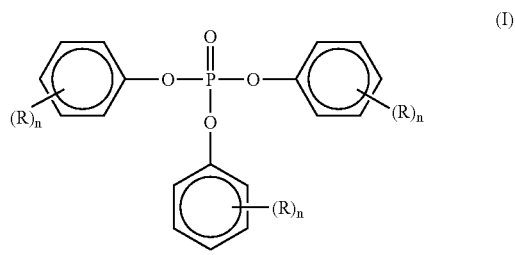

where each R is independently either a linear or branched $C_1$ to $C_6$ alkyl group, and n is independently an integer of 0, 1 or 2, but n may not be 0 in at least one instance.

3. The flame retardant polyurethane composition of claim 2, wherein the alkyl substituted triaryl phosphate ester comprises at least one of tricresyl phosphate, butylated triphenyl phosphate, and isopropylated triphenyl phosphate.

4. The flame retardant polyurethane composition of claim 3, wherein the alkyl substituted triaryl phosphate ester comprises a mixed isopropylated triphenyl phosphate containing about 8.6% phosphorus and also having about 35 wt. % of non-alkylated triphenyl phosphate.

5. The flame retardant polyurethane composition of claim 1, wherein the phosphorus-containing flame retardant comprises resorcinol bis(diphenyl phosphate).

6. The flame retardant polyurethane composition of claim 1, wherein the phosphorus-containing flame retardant comprises tris(2-ethylhexyl) phosphate.

7. The flame retardant polyurethane composition of claim 1, wherein the phosphorus-containing flame retardant consists of at least one of tri-n-butyl phosphate and tri-isobutyl phosphate.

8. A flame retardant polyurethane composition comprising:
    a flexible polyurethane foam reaction mixture including at least one polyol and at least one isocyanate; and
    a flame retardant additive comprising an alkyl substituted triaryl phosphate ester; and a phosphorous-containing flame retardant selected from the group consisting of: tris(2-ethylhexyl) phosphate, resorcinol bis(diphenyl phosphate), tri-n-butyl phosphate, tri-isobutyl phosphate and mixtures thereof wherein the ratio of the alkyl substituted triaryl phosphate ester to the phosphorus-containing flame retardant is from about 95:5 to about 80:20 percent by weight, and wherein the combined weight of the alkyl substituted triaryl phosphate ester and the phosphorus-containing flame retardant comprises about 5 to about 40% by weight of polyol.

9. The flame retardant polyurethane composition of claim 8, wherein the phosphorus-containing flame retardant includes at least about 5 wt. % phosphorus.

10. The flame retardant polyurethane composition of claim 8, wherein the alkyl substituted triaryl phosphate ester includes one or more compounds having the general formula:

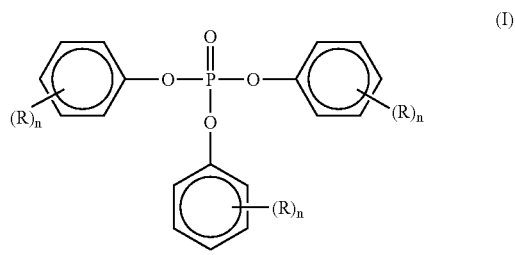

where each R is independently either a linear or branched $C_1$ to $C_6$ alkyl group, and n is independently an integer of 0, 1 or 2, but n may not be 0 in at least one instance.

11. The flame retardant polyurethane composition of claim 10, wherein the alkyl substituted triaryl phosphate ester comprises at least one of tricresyl phosphate, butylated triphenyl phosphate, and isopropylated triphenyl phosphate.

12. The flame retardant polyurethane composition of claim 11, wherein the alkyl substituted triaryl phosphate ester comprises a mixed isopropylated triphenyl phosphate containing about 8.6% phosphorus and also having about 35 wt. % of non-alkylated triphenyl phosphate.

13. The flame retardant polyurethane composition of claim 8, wherein the phosphorus-containing flame retardant comprises resorcinol bis(diphenyl phosphate).

14. The flame retardant polyurethane composition of claim 8, wherein the phosphorus-containing flame retardant comprises tris(2-ethylhexyl) phosphate.

15. The flame retardant polyurethane composition of claim 8, wherein the phosphorus-containing flame retardant consists of at least one of tri-n-butyl phosphate and tri-isobutyl phosphate.

16. A flame retardant additive for use in flame retarding a flexible polyurethane foam reaction mixture including at least one polyol and at least one isocyanate, the flame retardant additive comprising:

an alkyl substituted triaryl phosphate ester; and a phosphorous-containing flame retardant having at least about 5 wt. % phosphorus and including at least one monomeric phosphorus-containing compound selected from the group consisting of: tris(2-ethylhexyl) phosphate, resorcinol bis(diphenyl phosphate), tri-n-butyl phosphate, tri-isobutyl phosphate and mixtures thereof wherein the combined weight of the alkyl substituted triaryl phosphate ester and the phosphorus-containing flame retardant comprises about 5 to about 40% by weight of the polyol, and wherein the ratio of the alkyl substituted triaryl phosphate ester to the phosphorus-containing flame retardant is from about 95:5 to about 80:20 percent by weight.

17. The flame retardant additive of claim 16, wherein the alkyl substituted triaryl phosphate ester has the general formula:

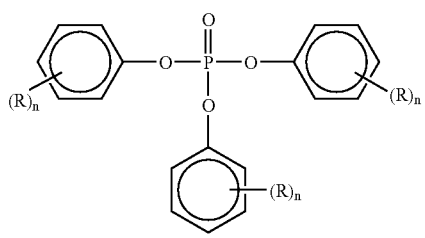

(I)

where each R is independently either a linear or branched $C_1$ to $C_6$ alkyl group, and n is independently an integer of 0, 1 or 2, but n may not be 0 in at least one instance.

18. The flame retardant additive of claim 17, wherein the alkyl substituted triaryl phosphate ester comprises at least one of tricresyl phosphate, butylated triphenyl phosphate, and isopropylated triphenyl phosphate.

19. The flame retardant additive of claim 18, wherein the alkyl substituted triaryl phosphate ester comprises a mixed isopropylated triphenyl phosphate containing about 8.6% phosphorus and also having about 35 wt. % of non-alkylated triphenyl phosphate.

20. The flame retardant additive of claim 16, wherein the phosphorus-containing flame retardant comprises resorcinol bis(diphenyl phosphate).

21. The flame retardant additive of claim 16, wherein the phosphorus-containing flame retardant comprises tris(2-ethylhexyl) phosphate.

22. The flame retardant additive of claim 16, wherein the phosphorus-containing flame retardant consists of at least one of tri-n-butyl phosphate and tri-isobutyl phosphate.

23. A method of making flame retarded flexible polyurethane compositions comprising the step of:

adding to a flexible polyurethane foam reaction mixture about 5 to about 40% by weight of polyol of a flame retardant additive comprising: an alkyl substituted triaryl phosphate ester; and a phosphorus-containing flame retardant having at least about 5 wt. % phosphorus selected from the group consisting of: tris(2-ethylhexyl) phosphate, resorcinol bis(diphenyl phosphate), tri-n-butyl phosphate, tri-isobutyl phosphate and mixtures thereof, wherein the ratio of the alkyl substituted triaryl phosphate ester to the phosphorus-containing flame retardant is from about 95:5 to about 80:20 percent by weight.

24. The method of claim 23, further comprising the step of pre-combining the alkyl substituted triaryl phosphate ester and the phosphorus-containing flame retardant prior to the step of adding the flame retardant additive to the flexible polyurethane foam reaction mixture.

25. The method of claim 23, wherein the alkyl substituted triaryl phosphate ester has the general formula:

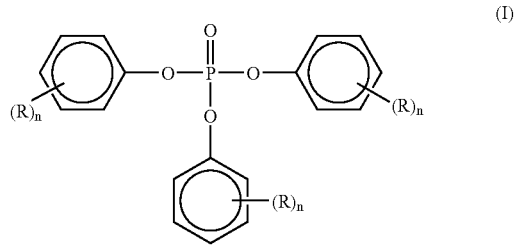

(I)

where each R is independently either a linear or branched $C_1$ to $C_6$ alkyl group, and n is independently an integer of 0, 1 or 2, but n may not be 0 in at least one instance.

26. The method of claim 25, wherein the alkyl substituted triaryl phosphate ester comprises at least one of tricresyl phosphate, butylated triphenyl phosphate, and isopropylated triphenyl phosphate.

27. The method of claim 26, wherein the alkyl substituted triaryl phosphate ester comprises a mixed isopropylated triphenyl phosphate containing about 8.6% phosphorus and also having about 35 wt. % of non-alkylated triphenyl phosphate.

28. The method of claim 27, wherein the phosphorus-containing flame retardant comprises resorcinol bis(diphenyl phosphate).

29. The method of claim 27, wherein the phosphorus-containing flame retardant comprises tris(2-ethylhexyl) phosphate.

30. The method of claim 27, wherein the phosphorus-containing flame retardant consists of at least one of tri-n-butyl phosphate and tri-isobutyl phosphate.

* * * * *